US011488353B2

(12) United States Patent
Dubroy et al.

(10) Patent No.: US 11,488,353 B2
(45) Date of Patent: Nov. 1, 2022

(54) MANUAL CURATION TOOL FOR MAP DATA USING AGGREGATED OVERHEAD VIEWS

(71) Applicant: Woven Planet North America, Inc., Los Altos, CA (US)

(72) Inventors: Patrick Dubroy, Munich (DE); Clemens Marschner, Munich (DE); Wilhelm Richert, Feldkirchen (DE); Thomas Schiwietz, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 197 days.

(21) Appl. No.: 16/836,805

(22) Filed: Mar. 31, 2020

(65) Prior Publication Data

US 2021/0303849 A1 Sep. 30, 2021

(51) Int. Cl.
*G06V 20/10* (2022.01)
*G06T 7/90* (2017.01)
(Continued)

(52) U.S. Cl.
CPC ............ *G06T 17/05* (2013.01); *G01C 11/06* (2013.01); *G06K 9/6254* (2013.01); *G06K 9/6257* (2013.01); *G06K 9/6267* (2013.01); *G06T 7/90* (2017.01); *G06T 11/60* (2013.01); *G06V 10/7747* (2022.01); *G06V 10/7788* (2022.01); *G06V 20/13* (2022.01); *G06V 20/17* (2022.01); *G06V 20/182* (2022.01); *G06V 30/19133* (2022.01); *G06V 30/19147* (2022.01); *G06T 2207/10024* (2013.01); *G06T 2207/10032* (2013.01); *G06T 2207/30256* (2013.01)

(58) Field of Classification Search
None
See application file for complete search history.

(56) References Cited

U.S. PATENT DOCUMENTS 7,298,869 B1 * 11/2007 Abernathy ........... G06K 9/0063
324/323
10,460,279 B2 10/2019 Lesser et al.
(Continued)

OTHER PUBLICATIONS

Bosch et al., "Sensor Adaptation for Improved Semantic Segmentation of Overhead Imagery", arXiv:1811.08328v1, pp. 1-9, Nov. 2018 found at: https://arxiv.org/abs/1811.08328.
(Continued)

*Primary Examiner* — Emily C Terrell
*Assistant Examiner* — Nathan J Bloom
(74) *Attorney, Agent, or Firm* — Christopher G. Darrow; Darrow Mustafa PC

(57) ABSTRACT

Examples disclosed herein may involve (i) obtaining a first layer of map data associated with sensor data capturing a geographical area, the first layer of map data comprising an aggregated overhead-view image of the geographical area, where the aggregated overhead-view image is generated from aggregated pixel values from a plurality of images associated with the geographical area, (ii) obtaining a second layer of map data, the second layer of map data comprising label data for the geographical area derived from the aggregated overhead-view image of the geographical area, and (iii) causing the first layer of map data and the second layer of map data to be presented to a user for curation of the label data.

20 Claims, 8 Drawing Sheets

(51) Int. Cl.
  *G06T 11/60* (2006.01)
  *G06K 9/62* (2022.01)
  *G01C 11/06* (2006.01)
  *G06V 10/774* (2022.01)
  *G06V 10/778* (2022.01)
  *G06V 30/19* (2022.01)
  *G06T 17/05* (2011.01)
  *G06V 20/13* (2022.01)
  *G06V 20/17* (2022.01)

(56) References Cited

U.S. PATENT DOCUMENTS

| | | | |
|---|---|---|---|
| 2008/0046172 A1* | 2/2008 | Ames | G01C 21/28 |
| | | | 701/532 |
| 2010/0045691 A1* | 2/2010 | Naito | G09G 5/36 |
| | | | 345/581 |
| 2013/0328924 A1* | 12/2013 | Arikan | G01C 21/32 |
| | | | 345/629 |
| 2014/0293047 A1 | 10/2014 | Morris | |
| 2016/0356625 A1* | 12/2016 | O'Beirne | G01C 21/367 |
| 2017/0140205 A1 | 5/2017 | Gueguen | |
| 2020/0034664 A1 | 1/2020 | Jacobs et al. | |

OTHER PUBLICATIONS

International Searching Authority, International Search Report and Written Opinion, PCT/US2021/025233, dated Jul. 13, 2021.

\* cited by examiner

MANUAL CURATION TOOL FOR MAP DATA USING AGGREGATED OVERHEAD VIEWS

CROSS REFERENCE TO RELATED APPLICATIONS

The present application hereby incorporates by reference U.S. patent application Ser. No. 16/731,902, which was filed on Dec. 31, 2019 and is entitled "Overhead View Image Generation."

BACKGROUND

Satellite imagery and aerial photography both provide a view of the earth from above, and both can be used in geographical studies such as to survey areas of land. While both processes can produce digital images, satellite images have greater large-scale scientific applications, and aerial photography has greater small-scale commercial applications.

Aerial images are typically generated using manual photography and do not provide orthographic or overhead views. Rather, they provide a variety of elevated and perspective views from a variety of overhead viewpoints of a geographic area as the aerial platform from which the images are captured passes over that geographic area. As a result, satellite imagery has more often been used for mapping, environmental monitoring, and archaeological surveys using satellites which continuously orbit the earth. Although satellites can provide greater coverage of the earth it comes at a high logistical cost. Further, satellite images of the earth's surface can be geometrically distorted due to camera lens' properties or undesirable movement of the satellites. This can provide inaccurate images of the real-world which often hinders their application for mapping purposes. Nowadays, although aerial photography can be more cost effective and be kept more up to date compared to satellite imagery, the image quality is also subject to various environmental factors which can hinder their use for mapping applications. Additionally, the images gathered typically give no or limited information on the surface elevation of a geographic area.

As satellite and aerial images are obtained from imaging devices at a significant distances above the earth's surface, objects may occlude what is visible at the imaging devices and so the images collected usually include a number of occlusions in the view captured of the earth's surface. Additionally, typically images are not captured at a sufficiently high resolution to be used to extract or generate mapping data such as map semantics and/or map features.

Current overhead-view maps that are generated using aerial photography, satellite imagery or cartography do not, however, typically generate sufficiently sharp images that can be used for applications that require high precision, such as for example with autonomous vehicles.

Moreover, existing techniques for manually or semi-automatically refining map data are time consuming, usually taking curators hours to manually clean and verify a given area of a map, as curators are typically only presented with limited field-of-view images in order to verify semantic map data. Thus, the data provided to the curators is typically not suitable for efficient or effective manual curation or annotation, and thus can lack scalability for larger geographical areas or large-scale map data.

SUMMARY

In one aspect, the disclosed technology may take the form of a first method that involves (i) obtaining a first layer of map data associated with sensor data capturing a geographical area, the first layer of map data comprising an aggregated overhead-view image of the geographical area, where the aggregated overhead-view image is generated from aggregated pixel values from a plurality of images associated with the geographical area, (ii) obtaining a second layer of map data, the second layer of map data comprising label data for the geographical area derived from the aggregated overhead-view image of the geographical area, and (iii) causing the first layer of map data and the second layer of map data to be presented to a user for curation of the label data.

In example embodiments, the first method may further involve generating the aggregated overhead-view image of the geographical area using a ground map of the geographical area and a plurality of images of the geographical area. In these example embodiments, the function of generating the aggregated overhead-view image further may involve determining a color for each of the aggregated pixel values.

Still further, in example embodiments, curation of the label data may comprise one or more of: verifying the label data, editing the label data, adding new label data to the label data, or removing incorrect or irrelevant label data from the label data based on the correspondence of the aggregated overhead-view image to the label data.

Further yet, in example embodiments, the second layer of the map data may be generated by automatically extracting label data from the aggregated overhead-view image of the geographical area, where the label data comprises semantic map data.

Further, in example embodiments, the label data may be automatically generated using one or more of: machine learning models; classifiers; or Generative Adversarial Networks.

Still further, in example embodiments, the label data comprises one or more of: lane boundaries; lane connectivity; speed limits; types of traffic elements; crosswalks; speed bumps; pedestrian paths or sidewalks; manhole covers; or curbs.

In another aspect, the disclosed technology may take the form of a second method that involves (i) receiving labeled map data of a geographical area from a mapping system, the labeled map data including: (a) a first layer of map data comprising an aggregated overhead-view image of a geographical area, where the aggregated overhead-view image is generated from aggregated pixel values from a plurality of images of the geographical area, and (b) a second layer of map data comprising label data for the geographical area derived from the aggregated overhead-view image of the geographical area, (ii) displaying the first layer of map data and the second layer of map data to a user, (iii) receiving user input comprising one or more adjustments to the label data, and (iv) causing the label data to be adjusted in accordance with the user input.

In example embodiments, the function of causing the label data to be adjusted in accordance with the user input may comprise one of (i) adjusting the label data locally and then providing the adjusted label data to the mapping system or (ii) providing the user input to the mapping system and thereby causing mapping system to adjust the label data.

Further, in example embodiments, the function of causing the label data to be adjusted in accordance with the user input may comprise causing the second layer of map data to be updated.

Still further, in example embodiments, the second method may further involve updating the displayed second layer of the map in accordance with the user input.

Further yet, in example embodiments, the one or more adjustments to the label data may be based on one or more of: a set of guidelines; a set of instructions; one or more plug-ins for adjustment; or one or more tools for adjustment input.

Further, in example embodiments, the one or more adjustments of the label data may comprise one or more of: visual manipulation; determining abnormalities; determining alignments/misalignments; inputting one or more annotations; selecting/de-selecting one or more of the label data; removing/re-embedding one or more of the label data; hiding/exposing one or more of the label data; or enlargement/diminution of one or more of the label data.

Still further, in example embodiments, the map layers may be stored in one or more local system or a remote system.

Further yet, in example embodiments, the second method may further involve causing a global map to be updated in accordance with the user input.

Further, in example embodiments, the function of displaying the first layer of map data and the second layer of map data may comprise displaying the second layer of the map overlaid on the first layer of the map.

In yet another aspect, the disclosed technology may take the form of a computer system comprising at least one processor, a non-transitory computer-readable medium, and program instructions stored on the non-transitory computer-readable medium that are executable by the at least one processor such that the computer system is configured to carry out the functions of the aforementioned first and/or second method.

In still yet another aspect, the disclosed technology may take the form of a non-transitory computer-readable medium comprising program instructions stored thereon that are executable to cause a computer system to carry out the functions of the aforementioned first and/or second method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which.

Figure 1:
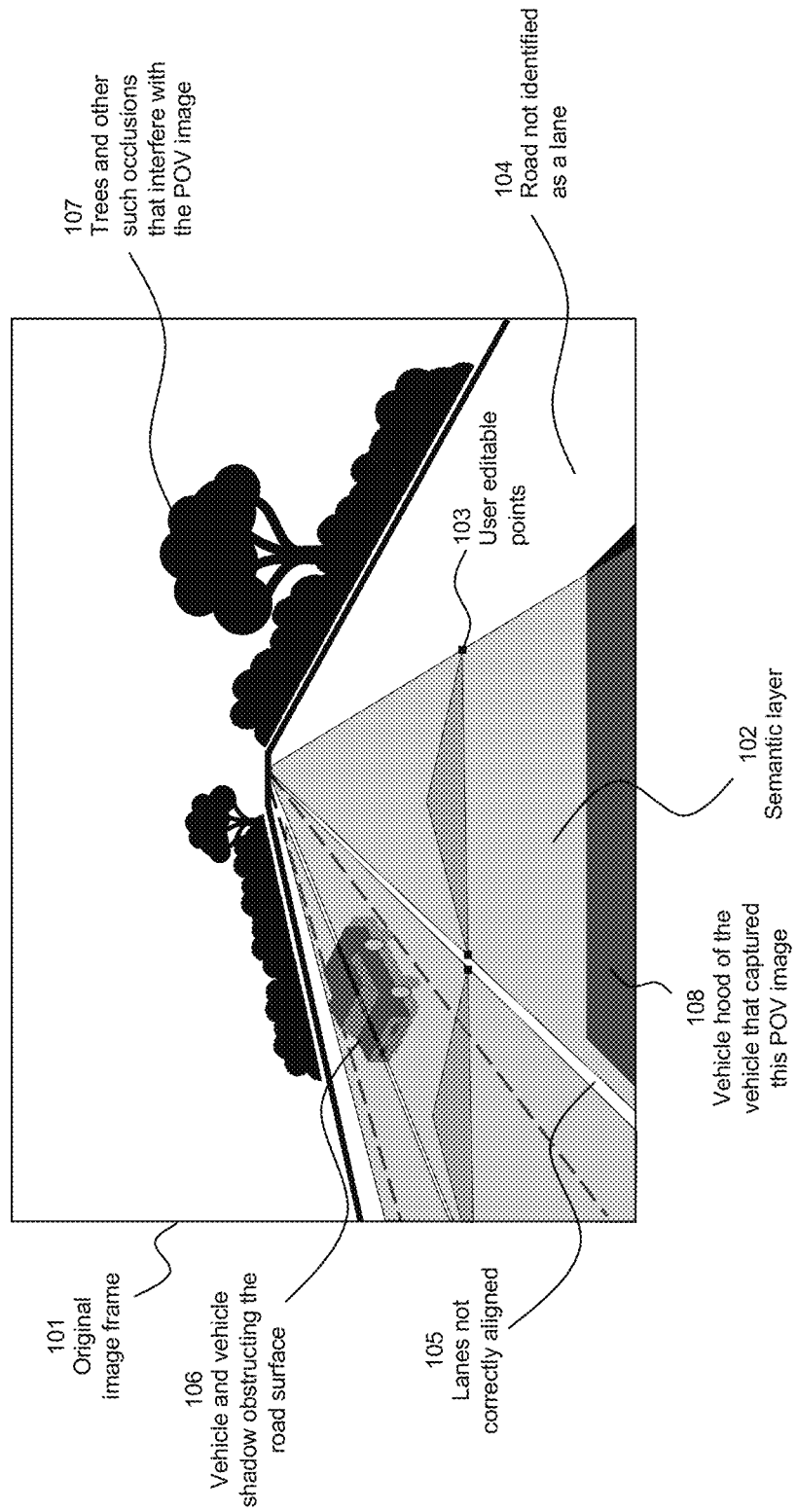
FIG. 1 illustrates an automatically aligned and labelled semantic layer on top of a single field-of-view image where the semantic layer contains incorrect semantic label data points.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

FIG. 1 shows a traditional method of map data curation which is carried out on an individual image having a limited field of view/perspective, which can be an image taken from a sequence of images captured for a geographical area. It will be appreciated that the term limited field-of-view images refers to images typically captured by one or more image sensors which are mounted on or within the vehicle (e.g., in sequence along a trajectory travelled by a vehicle). For example, this could be a frame of a video captured from a single camera that is facing forward (i.e. in the direction of forward travel of the vehicle) and mounted within the vehicle and which captures a sequence of image frames as a video as the vehicle traverses the geographical area.

FIG. 1 shows an example of an original image frame 101 (from the sequence of image frames) with an initial layer of semantic data 102 overlaid for a human curator to review and verify, edit or adjust using user-editable points 103. FIG. 1 also illustrates some possible errors in the semantic data 102, such as parts of the road 104 that not correctly identified as a lane and incorrect lane estimations 105, which lead to misaligned lane semantics where the lines of the layer of semantic data 102 clearly do not align with the lane markings of the original image frame 101. The image also depicts real-world objects such as other vehicles (and their shadows) 106 as well as nature 107 beside the road that can interfere with the images captured, or interfere with the curator being able to properly identify semantic features on the images and correct semantic data (e.g., by adding or modifying a semantic label). For example, such images may work well for verifying the semantic data for lanes on which the vehicle (from which the sequence of images was captured on) travelled, but this approach can result in limited accuracy when a curator attempts to correct semantic data for neighboring lanes, for example due to the three-dimensional perspective views being represented by a two-dimensional image.

Typically, large portions of a map, or sometimes an entire map, are manually reviewed and verified by a human curator (who may also sometimes be referred to as an annotator or a reviewer). Existing techniques of manually or semi-automatically refining map data, and particularly map label data, are time consuming, usually taking human curators hours to manually clean and verify a given area of a map. Traditional map refining tools provide human curators with limited, single field-of-view images captured by sensors from a vehicle that are correlated with geometric map information associated with the captured map area to allow the curators to manually correct, guide, or refine geographic and/or semantic map features or map data. However, the limited field-of-view images can be difficult to use to get a full view of the relationship of the map features in the image to the geometric map information and the single field of view that is currently provided can distort the geometric information, leading to difficult or inaccurate editing/curation of the map information.

Figure 2:
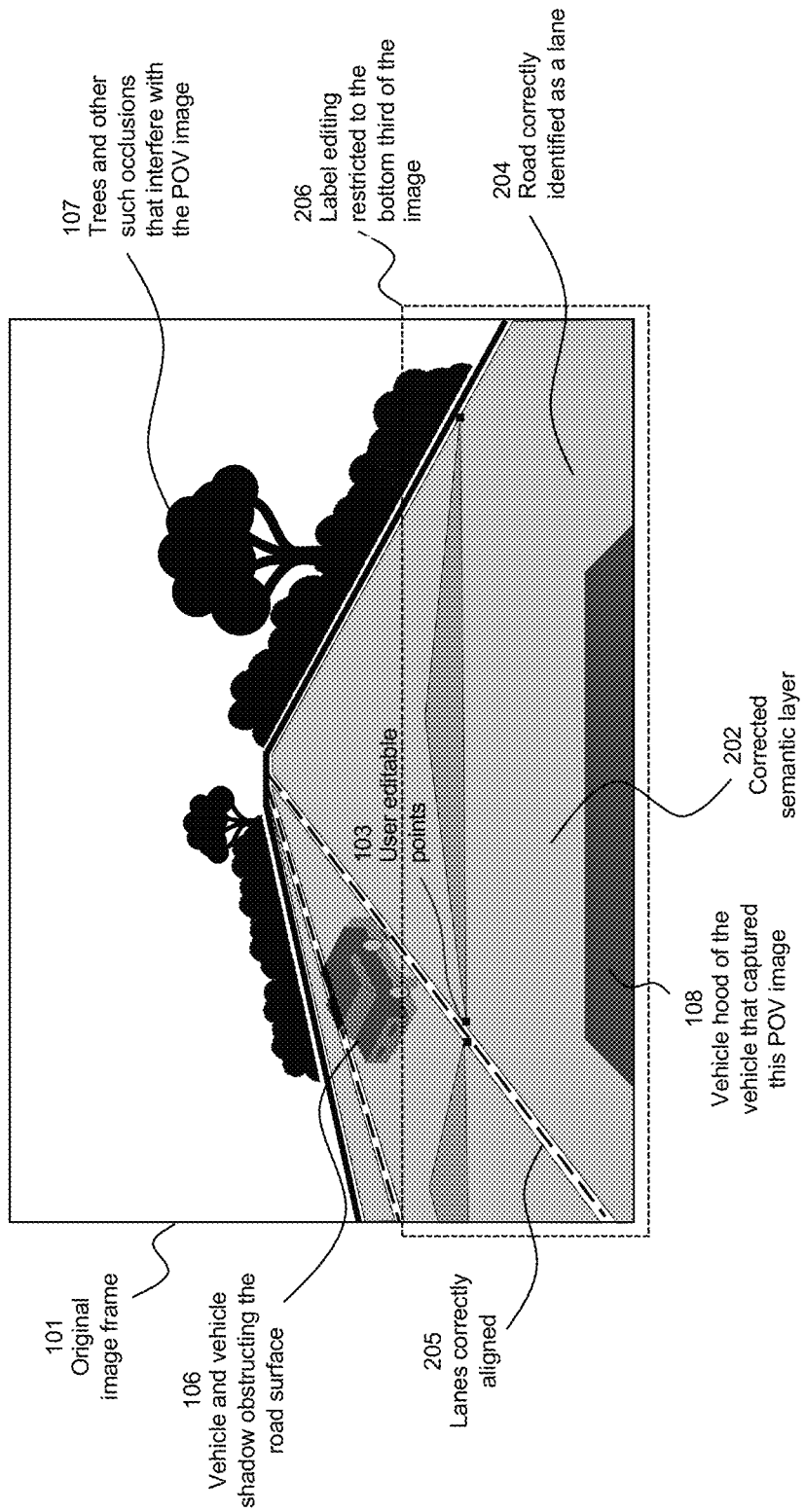
FIG. 2 illustrates corrected semantic label data overlaid on the single field-of-view image of FIG. 1.

FIG. 2 shows a manually-curated version of the field-of-view image and the overlaid layer of semantic data previously shown in FIG. 1. In particular, FIG. 2 illustrates an alignment of the semantic layer 202 to the image following manual curation of the semantic data associated with the image. The curator can correctly align the semantic layer, for example by adjusting the semantic data to correctly represent the lane area 204 in the layer of semantic data or correctly aligning the edges of the lanes 205 in the layer of semantic data to the lane markings on the original image using user-editable points 103. However, conventional manual review processes of field-of-view images and corresponding semantic label data typically lack scalability or precision.

Manual curation using these limited field-of-view images can be time consuming because there are many images for a geographic area that need to be reviewed in sequence in order to check the semantic data is correct, and the manual curation process also requires complicated labelling policy documentation to mitigate the limitations of the images used. For example, to illustrate with reference to FIG. 2, the curator may be restricted (by policy documents or the user interface system) to only edit semantic data in the bottom third 206 of the limited field-of-view image as any visible information above the bottom third of the image is likely to fall beyond a distance threshold or limitation as accuracy of the visual data decreases with distance from the image sensor(s) in single field-of-view images. Further, as mentioned above, limited field-of-view images often have objects or obstructions present, shadows, and other superfluous information contained in them that can make it difficult to accurately curate map information. Further yet, single field-of-view images are restricted to limited perspective views and angles, and other geometric image distortions. These problems can lead to restrictions on the use of such images for editing and may require additional image captures, long edit times and/or editing processes, multiple passes over the same region by multiple different curators, and/or highly trained curators. Still further, such limited field-of-view images being used to train semi-automatic or automatic curation processes would be computationally costly as many images need to be processed for a given geographical area.

Referring to FIGS. 3 to 8, example embodiments relating to a method of using aggregated overhead-view images of a geographical area for map data curation will now be described. Example embodiments use rich, contextual, aggregated overhead-view images (generated from sequences of multiple substantially ground level field-of-view images) to provide users such as curators with top-down views of a geographical area, street segment, and/or other features. In this way, such aggregated overhead-view images may provide rich, contextual, and unobstructed images to assist a curator with manual curation. The example embodiments enable map labelling to be performed using rich top-down views rather than limited field-of-view camera images. Once a manual curation task performed on an image such as this is verified, complete, and submitted, the results can be saved or stored in a map database. Additionally, once images have been verified and submitted following verification, the images can be stored for further distribution for quality assurance or be used as training data for an automated data-curation system.

Example embodiments describe map data curation using aggregated overhead-view images that have been generated using ground map data in combination with image data, which may involve aggregating pixel values from a plurality of source images of the geographical area. This type of aggregated overhead-view image can provide various advantages such as generating images that accurately align with simultaneous localization and mapping (SLAM) techniques. The example embodiments can also generate faster and more efficient image updates compared to aerial photography techniques due to the use of ground vehicles or substantially at-ground-level image sensors rather than aerial imagery, and can also generate images which do not include unwanted features that can occlude the drivable surface or the ground area as observed from above.

Overhead view images seek to represent the real-world surface of geographical areas. Although the images of the area/environment can be captured using vehicles equipped with image sensors or image sensor arrays, the raw images may also be obtained by an image sensor in any form, for example, a smartphone or a digital camera. The image data can also be accompanied by image metadata, including but not limited to, timestamp information, position and orientation (pose) data, Inertial Measurement Unit (IMU) data, and other corresponding sensory data, which can be transmitted to a network and/or other computer systems. Image data can be obtained as sequential image data or data collected over one or more trajectories, however, not every image collected is necessary or useful for overhead-view image generation due to occlusions, for example.

Figure 3:
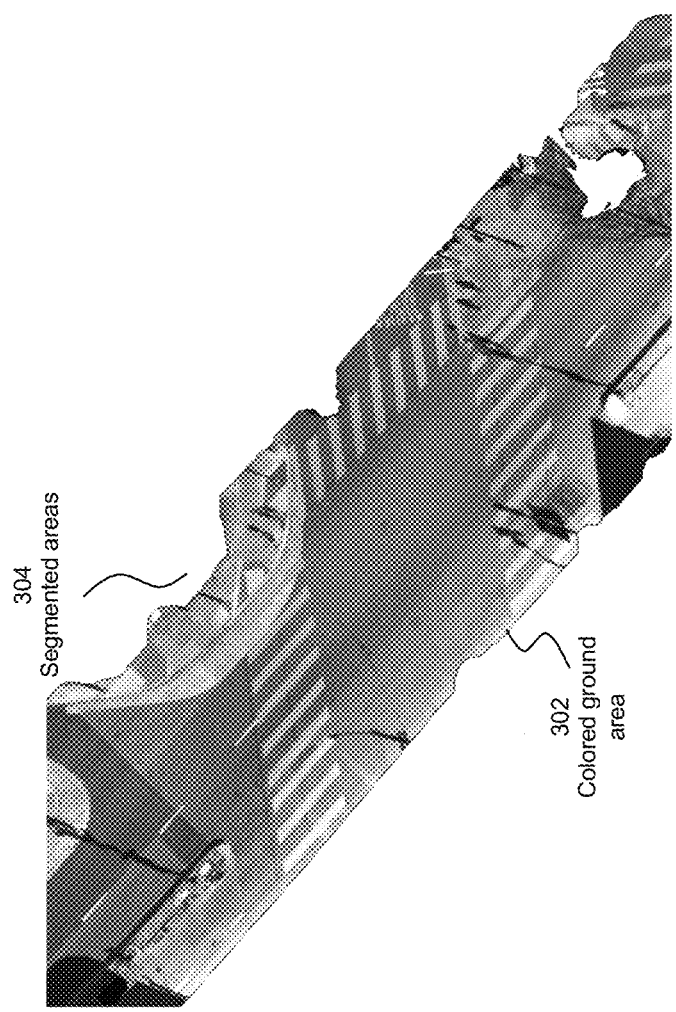
FIG. 3 shows an aggregated overhead-view image generated using ground map data and image data collected at substantially ground level.

FIG. 3 shows an aggregated overhead-view image, generated in an example embodiment. This illustration shows a colored drivable surface 302 excluding the segmented areas 304 where it has been determined that there is no drivable surface. Particularly, example embodiments seek to generate content rich aggregated overhead-view images of geographical areas on top of ground map data, the ground map data providing a representation of the surface topology of a geographical area, using limited field-of-view images captured from a substantially ground level perspective. This results in higher-resolution overhead-view images being generated without, or with substantially fewer, occlusions compared to using satellite or other aerially-captured images. Specifically, FIG. 3 shows a generated or aggregated overhead-view image of the ground surface 302 which clearly includes all the road markings and significantly less interference caused by trees, street furniture, and other occlusions.

In generating an aggregated overhead-view image, the ground area of the field-of-view images used for overhead-view image generation can be divided into two-dimensional sections or points, described herein as sampling points, cells, pixels or patches. Each sampling point is associated with a portion of the point cloud data of the ground map. Optionally, or additionally, the raw image or the ground map can be divided into sections of the geographic area based on a global positioning system (GPS) or other coordinate scale. Dividing the ground map into a plurality of sampling points comprises dividing the ground map into any one or any combination of: square grids, tiles, and/or quadtrees and/or hierarchical spatial data structures. As it would be known to a skilled person, in order to support large ground areas that might not fit into one single generated overhead-view image, the ground area can be represented by smaller images, divided by sub regions or into small sections, on top of which a quadtree is built for fast navigation and small memory footprint.

In some embodiments, the ground map can be queried in order to determine a three-dimensional position of all of the visible sections of the environment to be mapped in each image of the environment. In example embodiments, in order to determine which images capture a view of the same scene or location, intersection rays are extrapolated and computed for each image from each respectable camera's origin to the ground map point. Back-propagation of intersection rays determines the relevant portion of each camera image.

In embodiments, the selection of which of the input images are determined to represent each sampling point on the ground area will now be described. The image-view rays for each image can be computed from the ground map sampling point to each of the image field-of-view points. As the vehicle traverses along a trajectory, only certain sample points will be visible at certain positions of the imaging device and thus can be used to determine the color of the sampling point in the generated overhead-view image.

In example embodiments, the color of each of the patches of the aggregated overhead-view image can be determined by determining a correlation between the sampling points of the ground area and the color of each sampling point captured by one or more of the plurality of images including a view of the respective sampling point. For example, the correlation can be a determined two-dimensional coordinate in an image (or alternatively a determined area of an image) corresponding to a three-dimensional coordinate of the ground map. In this way, each sampling point of the ground area is queried against all images in which each point of the ground map is visible and relevant pixels in the images are aggregated to determine a color for each sampling point, which is used as the color of the corresponding patch of the aggregated overhead-view image. Although a color can be determined for each patch based on one camera view image, in example embodiments the color is determined for each of the sampling points from the correlated areas of multiple images. Optionally, the color can be determined for at least one pixel of a portion of a camera image that is not masked out by any segmentation. However, in some embodiments, the color for each of the sampling points can be determined from the correlating areas of multiple images, and more specifically from the relevant pixels of portions of camera images that are not masked through segmentation. In some embodiments, a median or appropriate algorithm may be used to determine the color for each patch.

Although an aggregated overhead-view image of an area can be generated using images obtained over a single trajectory, for example, this may not generate a complete overhead-view image due to gaps where there are occlusions between the camera sensor and some of the sampling points of the ground area. Therefore, in some embodiments, it can be computationally efficient to load or generate the aggregated overhead-view image only when sufficient data is obtained for each section of the map (e.g., data from multiple trajectories over a geographical area that is obtained from one or more vehicles) in order to reduce costly iterative computation and processing to recreate large and dense overhead-view images when new data is collected to fill in missing portions of generated overhead-view images. For instance, in some embodiments, five to ten data collects (i.e. sequences of images gathered along a trajectory), or data streams can be used. In other embodiments, a dataset of thirty to fifty images can be used to determine the average or median value of a patch color. In example embodiments, all camera images that potentially include within their field of view each sampling point are determined for each sampling point. Thus, in example embodiments, the quality of color representation can be improved with more collects at the same location or of the same geographic area. In some embodiments, typically five to ten data collects, or data streams are collected.

In example embodiments, the exact field-of-view ray, or image rays, for each image to sampling point is computed so that each sampling point can be associated with each image collected that includes that sampling point in its field of view. For each sampling point, the color at the corresponding intersection with the image plane is determined. In this way, a list of color values can be determined and stored for each image that views the sampling point which can be used to determine the final output color for the generated overhead-view image once sufficient data is collected.

More detail about generating overhead-view images suitable for manual curation is described in further detail in U.S. patent application Ser. No. 16/731,902 entitled "Overhead View Image Generation," which as noted above is incorporated herein by reference in its entirety.

In some embodiments, it is possible that aggregated overhead-view images generated in the manner described above could include errors, examples of which include duplicated structures, blurriness, distortion, shadows, and/or errant artifacts (e.g., semi-circular artifacts caused by presence of a vehicle roof/hood), among other possibilities. In this respect, certain errors corrections may be applied in order to improve the quality of the aggregated overhead-view images, examples of which may include a modification to one or more of the parameters related to the field-of-view image data used during generation of overhead-view images, a modification to one or more of the parameters related to point cloud data used during generation of overhead-view images, a modification to one or more of the parameters related to calibration and/or synchronization of different sensor units used during generation of overhead-view images, a modification to one or more of the parameters related to generation of SLAM information used during generation of overhead-view images, and/or a modification to one or more of the parameters related to certain processing techniques (e.g., segmentation, projection, filtering, augmentation, etc.) that are utilized during generation of overhead-view images, among other possibilities.

In some embodiments, an aggregated overhead-view image can be very large and therefore it may not be possible to be stored as a single image file. In order to support large areas that might not fit into one single image, the aggregated overhead-view image can be divided into smaller images by sub regions or small sections for more efficient data storage and processing.

Further, in some embodiments, an aggregated overhead-view image can be stored as part of a multi-layer map, which may be comprised of multiple layers of map data having a common reference frame/coordinate system. For instance, in example embodiments, such a multi-layer map may include, but not be limited to, a geometric map layer and a semantic map layer (along with any other layers that may be appropriate to capture relevant information for an area). In this respect, the geometric map layer may include a ground map and/or an aggregated overhead-view image. In turn, the semantic map layer may include any information about an area that may help a user identify and describe the relationships and actions that are appropriate for the area. For example, the semantic map layer may include lane geometries, lane connectivity, identification of traffic elements (e.g., traffic lights, traffic signs, etc.), street elements (e.g., cross-walks, etc.), and any other relevant information. Much of this information may be extracted from sensor data collected in the region. However, as described above, it can be difficult to accurately extract this information from single images that have imperfect or subjective points of view at an accuracy level that may be useful for vehicles and/or other robotics platforms to rely upon. For example, lane geometry data can be more efficiently extracted from the highly contextual overhead-view image data that is generated from a variety of different collections and/or captures of the area across different times, conditions, and positions.

In example embodiments, improving the quality of maps using techniques to validate and/or align data can be used to recreate or update such maps. Map features and map information can be extracted to edit, improve and create layers of maps which can include, but are not limited to a geometric map (which may comprise a ground map) and/or a semantic map. Using a content rich aggregated overhead-view image can also enable other map semantics to be extracted or improved or annotated more efficiently and with more accuracy compared to using field-of-view images. However, in some embodiments, it may be also possible to extract information to edit semantic information from the field-of-view image.

The geometric and semantic map layers can provide information about the static and physical parts of an environment that are important to, for example, autonomous and semi-autonomous vehicles. These map layers can be built at a very high fidelity and high precision about what the ground truth is. In example embodiments, the map is viewed as a component that not only captures an understanding of the physical and static parts of the world, but also dynamic and behavioral aspects of the environment.

In some embodiments, the semantic map layer may contain or be associated with a road network graph. The road network graph can represent the road segments and the interconnections for a geographical area, including for example: how many lanes there are for each road segment; what direction of travel is permitted in each lane; and how each road segment is connected to other road segments. The road network graph may also represent the yield/right-of-way properties between road segments and neighboring lanes, so that autonomous vehicles (or semi-autonomous vehicles/driver assistant systems) are able to navigate/understand transitions between road segments, lanes and operate safely at intersections or crosswalks/crossings when encountering vehicle or pedestrian traffic. These are complex properties that can change in relationship to other layers: for example, the state of a traffic light may influence which lanes need to yield; or alternately some lanes can vary between being one-way or two-way depending on the time of day. Autonomous vehicles (or semi-autonomous vehicles/driver assistant systems) may use the road network graph to determine a path from A to B, and detailed semantic map information can help the such vehicles mitigate risk by for example understanding the connections and relationships between different portions of an area the vehicle is traveling through and help to understand how other agents may behave in the environment as well as what paths and relationships others may expect the vehicle to move through.

As with any large dataset there will undoubtedly be a percentage of broken or corrupt map or image data. Therefore, in some embodiments, new data that corresponds to an area needs to be tested before being incorporated or used to update parts of a map. In some cases, the new data is only incorporated in the global map if it satisfies a predetermined quality threshold. As large amounts of data are gathered, the predetermined quality threshold can be relatively high. Overhead-view images can be flawed due to breaks or errors within the data, a lack of data, or outliers in data obtained by image sensors used to generate overhead-view images. Map layers can be misaligned for numerous reasons such as timestamp error or the lack of calibration of sensor data.

Map data cleaning is the manual process of visually inspecting map layers and map data and labelling or editing the broken/misaligned/incorrect areas, which can then be corrected to help improve the quality of the final map. In example embodiments, therefore, a pre-processed or pre-generated overhead-view map or overhead-view image is generated or received, and portions of the map or image are extracted and determined whether validation is required. If required, map data cleaning can be performed.

Example embodiments will now be described of manual curation/map data cleaning of a geographical area of a map that is based on an overhead-view image. With the example embodiments presented herein, by using an accurate and more complete overhead view of a geographical area it is easier for users to understand and avoid inefficient processing of multiple individual images as only one overhead-view image is required for a geographical area (rather than a sequence of limited field-of-view images). These overhead views can be used to provide semantic information for the whole geographical area rather than being reviewed by stepping through a sequence of limited field-of-view images one at a time.

Figure 4:
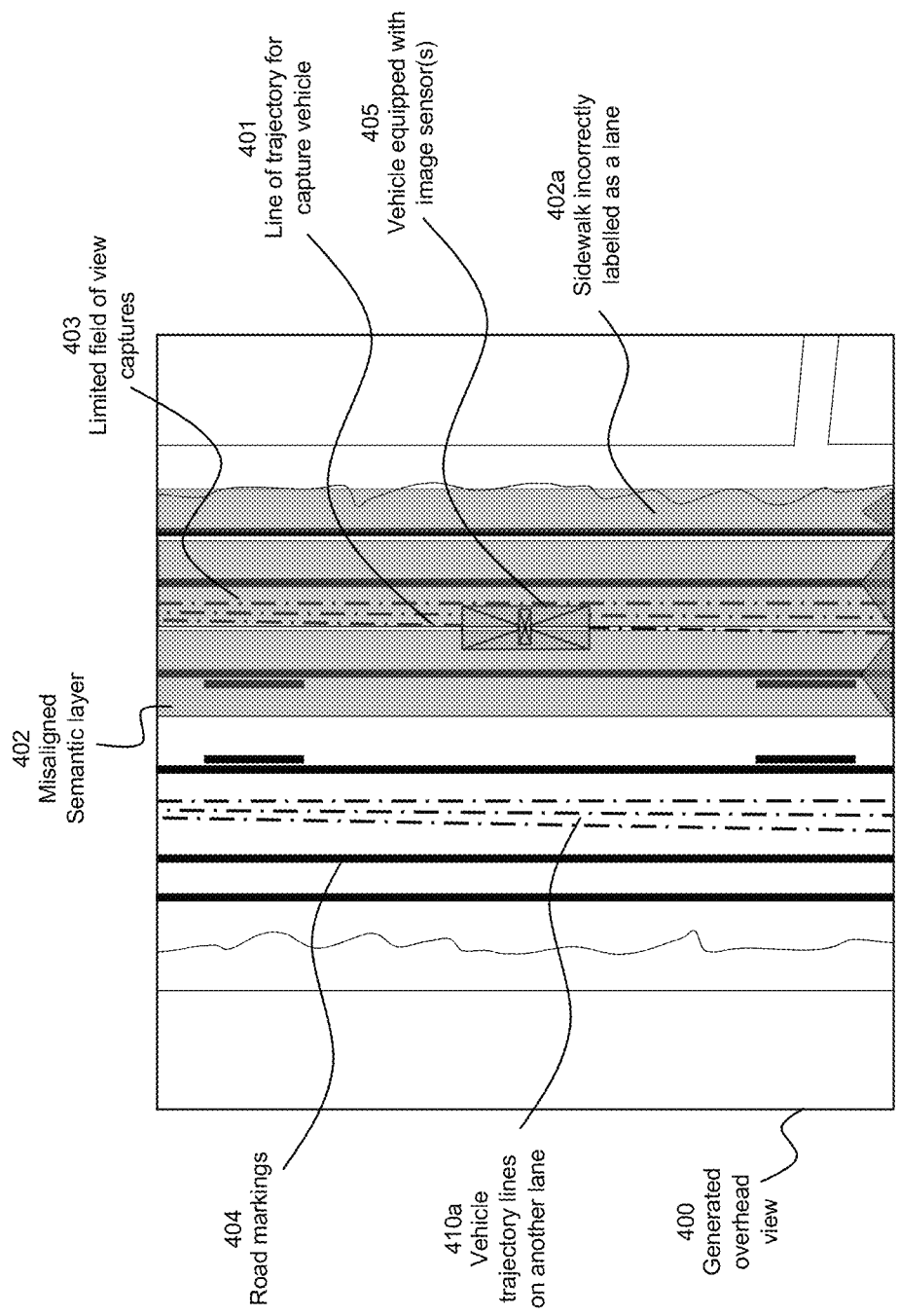
FIG. 4 illustrates an automatically aligned and labelled semantic layer on top of an overhead-view image layer where the semantic layer contains incorrect semantic label data points.

In example embodiments, errors may still arise within a map that is based on an aggregated overhead-view image due to misalignments of the semantic layer for example. For instance, FIG. 4 depicts a map of a geographical area that may be presented by a curation tool or the like. As shown in FIG. 4, the presented map includes an aggregated overhead-view image 400, three vehicle trajectory lines 410a in each lane and road markings 404. A vehicle equipped with an image sensor(s) 405 is shown along its traversed trajectory line 401. Each trajectory line is illustrated with points where the image sensor captures a limited field-of-view image that can be used in accordance with the methods described above. Further, as depicted in FIG. 4, a semantic layer 402 of the map may include a portion of the pavement/sidewalk 402 that is incorrectly classified as the road surface and as part of a lane, and the lanes in the semantic layer 402 may not correctly align to the lane markings shown in the overhead-view image. The severity of these errors may be a subjective but can be important depending on the required precision of the map. Thus, it may not be entirely reliable to implement a fully automated system and therefore a semi-automated system with guidance can be provided to data curators through a user platform.

Figure 5:
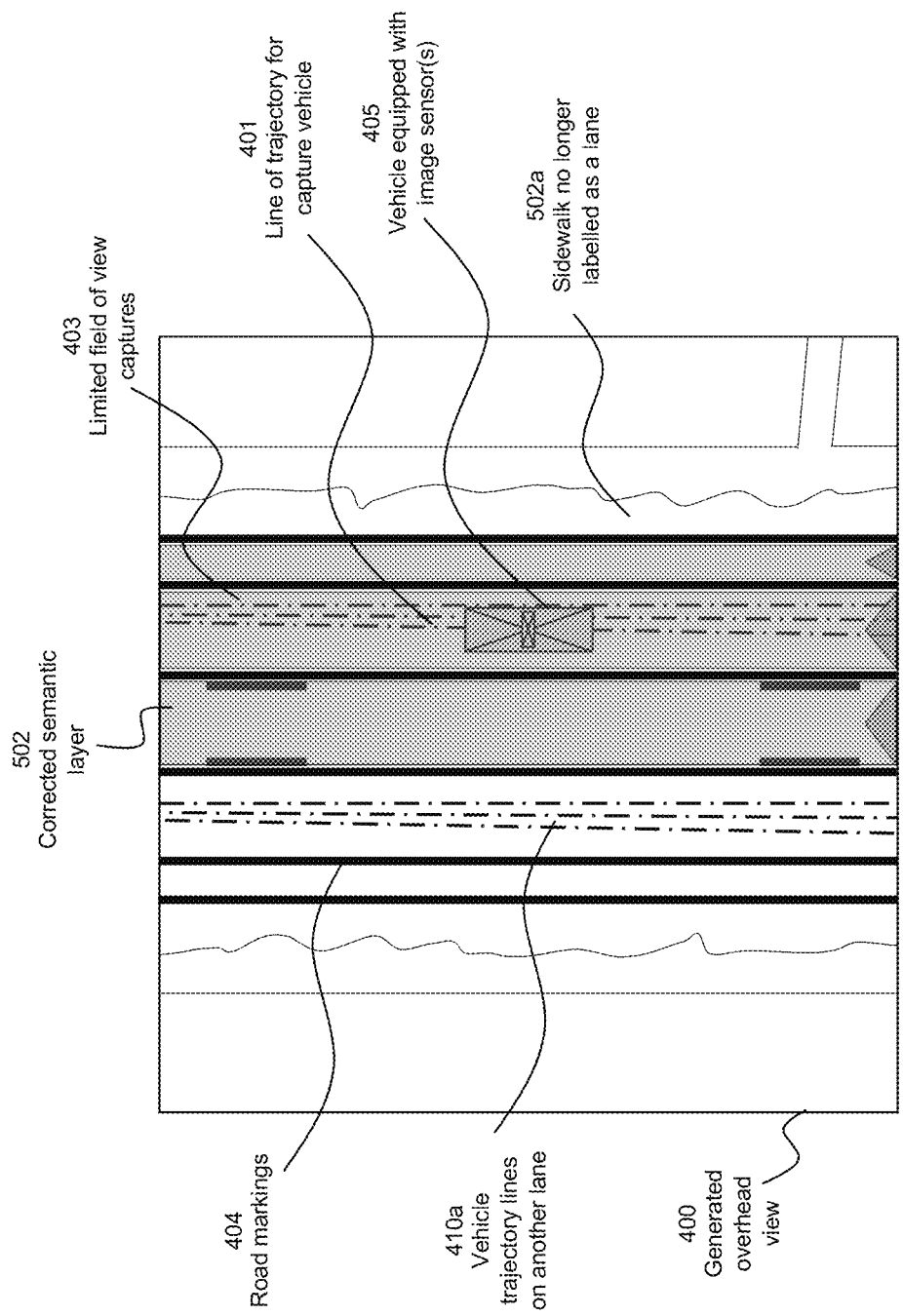
FIG. 5 illustrates corrected semantic label data overlaid on the overhead-view image of FIG. 4.

FIG. 5 shows a corrected version of the map illustrated in FIG. 4 once it has been reviewed and adjusted by a user such as a curator. In particular, FIG. 5 shows a more accurate alignment of the semantic layer 502 within the map data. FIG. 5 shows the correction made by a user that adjusts the alignment of the lane labels such that the sidewalk/pavement is longer considered to be a lane on the road 502a. As described above, a human user may user editable points (similar to points 103 depicted in FIGS. 1 and 2) attached to, or embedded within, parts of the semantic layer to correct any misalignment errors between the aspect of the map represented in the aggregated overhead-view image and the semantic data. Additionally, once the semantic data for the map or areas/sections thereof have been verified and submitted as complete following verification, the images and semantic data can be stored for further distribution for quality assurance or be used as training data for an automated data curation system.

Optionally, in some embodiments, for assistance to the users, trajectory line 401 of the vehicle 405 and/or lines 410a of other vehicles may provide the ability to access and view the limited field-of-view images 403 that were used to generate the aggregated overhead-view image. In some cases, the human user may be provided with a corresponding limited field-of-view image(s) for each section of the geographical area to use for further verification. Vehicle trajectories can provide guidance for curators to edit, adjust or verify the drivable area (or other semantics data) of the map more accurately.

Figure 6:
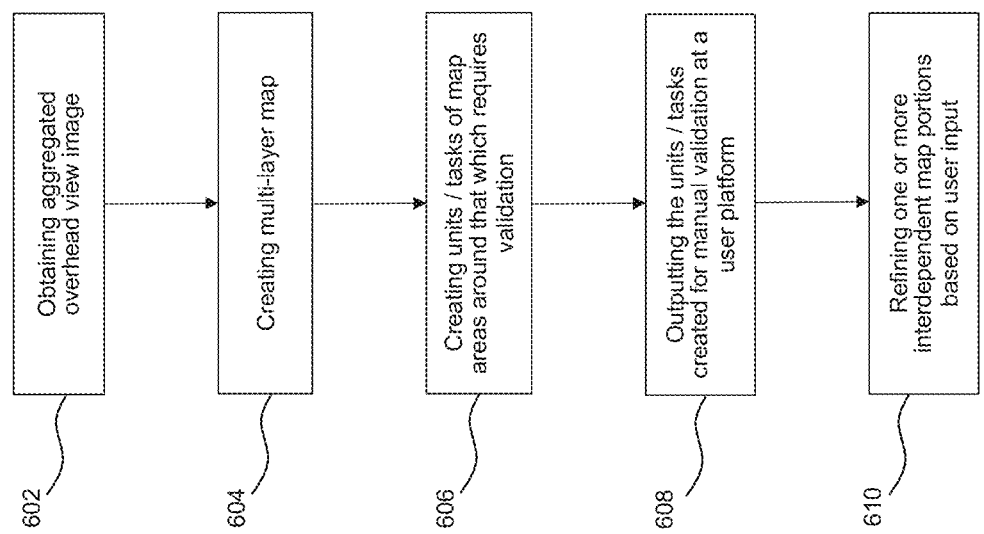
FIG. 6 shows a flowchart for use with generated overhead-view images showing the steps of manual curation of map data and semantic labelling.

FIG. 6 shows an example process showing some example functions that may be carried out to facilitate manual curation of a map that includes a first layer comprising an aggregated overhead-view image of a geographic area and a second layer comprising label data for the geographic area. In order to enhance the accuracy of the map, a user can adjust the second layer of data (e.g. drivable areas or other semantic labels) to conform more accurately with the aggregated overhead-view image. In practice, this example process may be carried out by a computer system such as a cloud-based mapping system (which may take the form of the computer system 800 described below with reference to FIG. 8), which may be communicatively coupled to a user platform or system (which could also be referred to as a task management system, a manual validation system, or the like) that can be accessed by a plurality of curators to verify and submit tasks. In some embodiments, once a task is verified, complete, and submitted, the results can be saved or stored, and the same task can be accessed with a given uniform resource locator (URL) for example.

As shown in FIG. 6, the example process may begin at block 602 by obtaining an aggregated overhead-view image.

At block 604, based on the aggregated overhead-view image, a map that that includes a first layer comprising an aggregated overhead-view image (e.g., a geometric layer) and a second layer comprising label data may be created (e.g., a semantic layer). In this respect, the function of creating the map may involve automatically extracting the label data (e.g., semantic map data) from the aggregated overhead-view image using one or more of: machine learning models, classifiers, or Generative Adversarial Networks.

At block 606, a set of tasks or units to be completed with respect to the map (e.g., tasks for map areas that require validation) may be created based on variables such as approximate time to complete task, for example.

At block 608, the created set of tasks or units to be completed with respect to the map may be output to a user platform (e.g., a curator's computer system), which may present the created set of tasks or units to a curator.

At block 610, the map may be refined based on user input received via the user platform, where such user input may reflect reasoned or quality-based judgements, annotations, and/or visual manipulations of the section or area of the map. In this respect, the user input may comprise a requested adjustment to label data included in the second layer of the map, and the function of refining the map may involve (i) refining the map data based on adjusted label data that we created locally by the user platform or (ii) adjusting label data at the mapping system based on user input received from the user platform.

In some embodiments, prior to presenting such maps or areas of such maps for manual verification, there can be provided a function of automated processing of the map data in order to highlight high-confidence defects to curators. For instance, in some embodiments, a checklist of predetermined errors can be used by an automated processing function to determine if there are any errors in any portion of a semantic layer of the map data and these errors can be used to highlight high-confidence defects to curators. In other embodiments, where conflicting semantic labels are applied to regions of the map (for example to indicate that an area of a map is both a drivable road and a non-drivable sidewalk or verge) then the automated processing function can highlight this as a high-confidence defect. In some embodiments, the processing used to produce the semantic label data from the aggregated overhead-view image is configured to output confidence values for each semantic feature that is generated or determined from the overhead-view image and where semantic label data is output with a low confidence value (or a confidence value below a predetermined threshold) then this can be highlighted as a high-confidence defect to the curators. In some embodiments, the automated processing function can further suggest one or more corrections for each of the highlighted high-confidence defects (for example a new location of a semantic label can be recommended and the difference between the label in the semantic layer and the recommended new location for the semantic label can be displayed to the data curators). To assist the curators, for each semantic label or recommended new location of a semantic label, the relevant original image(s) used to generate the overhead-view image can be shown alongside the overhead-view image to the data curator to enable the data curator to validate or correct the semantic labels.

Figure 7:
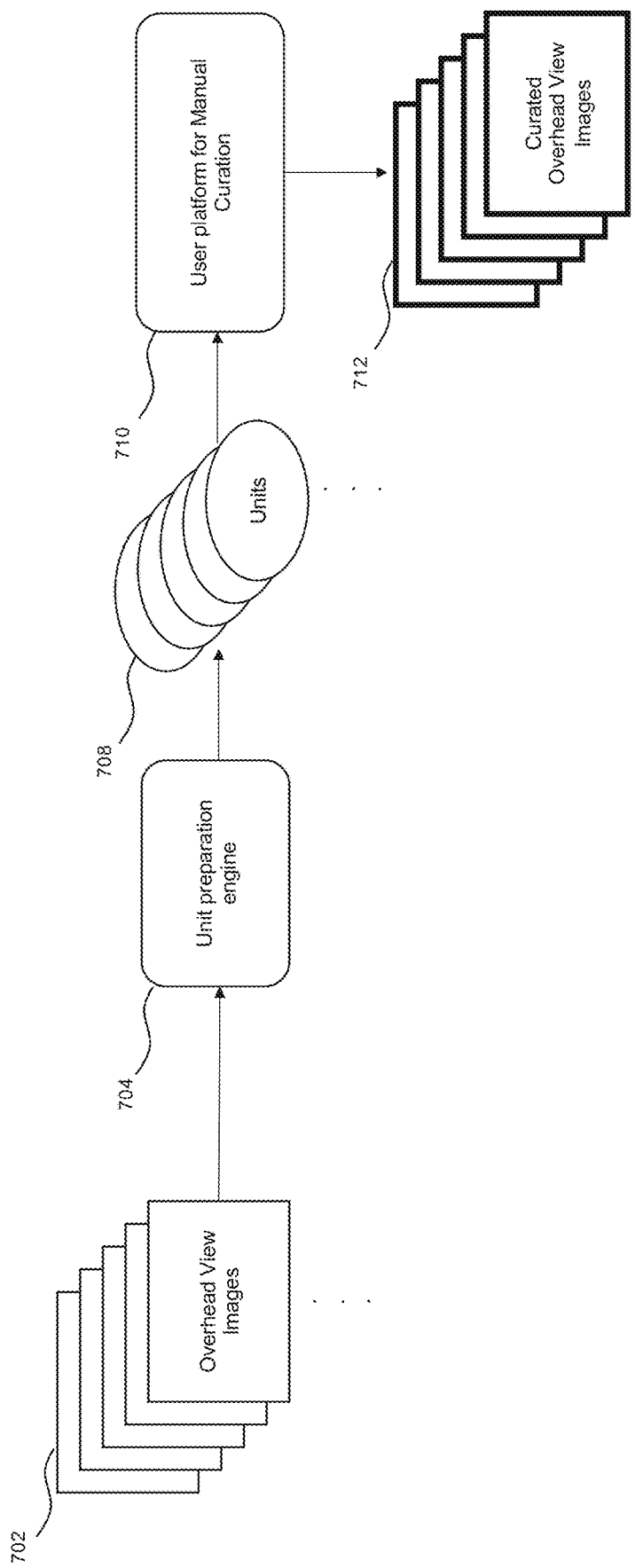
FIG. 7 illustrates an overview of the user interface tool used and the distribution of tasks to manual curators.

Turning to FIG. 7, an example of a pipeline for preparing map data to be checked automatically/manually/semi-automatically is illustrated, which may enable allocated or prepared tasks to be performed by a curator or team or curators. As shown in the example pipeline of FIG. 7, one or more overhead-view images 702 included in a map may be input into a unit preparation engine 704, which may prepare one or more units for curation and may then output the one or more units to a user platform 710 that enable a curator to curate the overhead view images 712 (e.g., by modifying, adding, or removing label data).

In example embodiments, the one or more units 708 can include more than one section or area of the map and in some embodiments can be allocated in accordance with the time it takes to verify the map data or based on the contextual analysis of each section or area. For example, each unit (or "task") prepared for validation/verification or judgment could be of approximately ten to fifteen-minute tasks, however it is not limited to this and may for example be a shorter or longer task depending on the level of quality assurance a particular section or area of the overhead-view image has previously been assessed for.

Further, in some embodiments, the one or more units 708 prepared for manual curation through the unit preparation engine 704 may be combined, collected or grouped together in various permutations. For computation cost efficiency, systems can group and prepare overhead-view images or areas/sections thereof together based on a variety of factors. In some embodiments, previously-verified overhead-view images of an overlapping area can be prepared into a unit of overhead-view images or areas/sections thereof to enable the curator to make more accurate or better reasoned judgements based around context of the area. In example embodiments, the curator may be required to review and verify image data within the overhead-view image in order to recreate or update the global overhead-view map or sections of the global overhead-view map.

In example embodiments, the one or more units 708 or areas/sections thereof are presented to a curator based on co-geographical location or context for example. Example embodiments may also present units in substantially computationally cost efficient or cost effective method depending on a variety of factors, such as for example the geographical location of a curator and/or the time set for tasks on each of the curator's platform or system, or alternatively the curator may be capable of selecting tasks to be performed. In some embodiments, in order to assist the process of manual curation, it can be useful to understand the mapped environment such as the vehicle path or field-of-view images of the area in order to assess overhead-view images or areas/sections thereof more effectively based around context.

As noted above, the one or more units 708 may be output to a user platform 710, otherwise known as a manual curation or validation platform or system, which may then enable the curator to make judgments and verify semantic data for map areas represented by unit(s) 708. A curator may check each representation of a geographical area included within the unit and input one or more judgments such as annotations of the semantic layer of map data for the respective geographical area. In example embodiments, the user platform 710 can provide a map layer presentation which can display to the curator a centered view of the map, a semantic layer and/or geometric layer of the map based on the overhead-view image generated of the ground map or drivable surface.

As shown in FIG. 7, the verification of tasks is performed via the user platform 710 to essentially visualize and allow a curator to validate and/or correct map data. As aforementioned, the system may include automated and/or semi-automated sematic curation steps (not included in FIG. 7). Curators may also be able to create annotated comments regarding any aspect of the task being assessed. By way of semi-automatically validating or verifying overhead-view images or areas/sections thereof to be used to regenerate a global overhead-view map essentially solves the problems that arise from assumptions of automatic assessment and analysis.

In example embodiments, the user platform 710 can be provided using the computer system 800 shown in FIG. 8 and described in more detail below.

In example embodiments, the user platform 710 in FIG. 7 can include one or more overhead-view image curation engines or software tools to perform the tasks associated with generating more accurate and precise overhead-view images, enabling visibility of labels and/or tags, which may be determined automatically or by means of manual input, to a user or a plurality of users. The user interface of the user platform 710 may form part of a web platform and/or a browser extension which provides users with the ability to manually label, tag and/or edit overhead-view image data. The user platform 710 may include a curation capture engine that functions to capture and store manually curated data. In some embodiments, the user platform 710 may provide a curator with tools to, for example, rotate overhead-view images, highlight overhead-view images or areas/sections thereof, label overhead-view images or areas/sections, or visualize the impact of decisions or inputs. Inputs may include for example, labelling map layers, labelling map data, labelling buildings, road names, and/or tourist attractions or landmarks.

The quality checking of overhead-view images or geographical areas/sections is reliant on the accuracy of the curators, so it is vital to ensure the curators are as accurate as possible. Thus, by presenting the semantic data on a generated overhead-view image, human curators can review the map data and data points for an entire geographical area in one view and the semantic data can be annotated, reviewed, and/or adjusted to align the various layers of the overhead-view image map for an entire geographical area without needing to review a sequence of limited field-of-view images and correct semantic data in each of the sequence of limited field-of-view images. In example embodiments, the curators can make edits or adjustments and/or manually label data by any one or any combination of: visual manipulation; determining abnormalities; determining alignments/misalignments; inputting one or more annotations; selecting/de-selecting one or more of the preliminary label data; removing/re-embedding one or more of the preliminary label data; hiding/exposing one or more of the preliminary label data; or enlargement/diminution of one or more of the preliminary label data. In example embodiments, the curator may also be capable of altering the dimensions of the adjustable semantic layer to determine a more accurate and precise overhead-view image.

The user interface presented to a curator by the user platform 710 may present a portion of the overhead-view image overlaid with the semantic data for that portion of the overhead-view image. In addition, the user interface can also display, at the curator's option using a toggle or switch in the user interface controls, the one or more images originally captured for the relevant region of the overhead-view image that were used to generate the overhead-view image—this enables the curator to verify, using a different point of view, whether the semantic data is correct or needs adjustment. Adjustment of the semantic data can be accomplished through the user interface by using the various inputs devices available to the curator, for example a mouse, touchpad, touch interface, stylus and/or keyboard, to drag the labels to correct positions or adjust bounding boxes or lines to adjust the dimensions of the semantic data relative to the overhead-view image and/or the original point-of-view images. Missing semantic labels, for example for pedestrian crossings, lampposts, trees, sidewalks, stationery vehicles, segmented areas, drivable road surfaces, road lanes, roundabouts, lane markings, zones where specific traffic rules apply, etc. can be added. Similarly, existing semantic labels for these items can be adjusted if misplaced. Existing semantic labels that are left without amendment may be assumed by the user platform 710 to be considered correct by the curator.

As tasks are generated, in some embodiments a pool of tasks may be allocated to each of the curators or a plurality of data curators. In some embodiments, for quality assurance purposes, once a task has been completed or a unit has been verified or annotated, the task may be passed onto a second curator for further assessment and analysis/quality checking. Curators can review and verify existing overhead-view images or areas/sections thereof, newly generated overhead-view images or areas/sections thereof, and existing overhead-view images or areas/sections thereof which have already been through the verification process. However, in some semi-automated processes, the computer system or algorithm may take over in further assessing the overhead-view images or areas/sections thereof.

In example embodiments, there can be guidance provided via the user interface of user platform 710 to help curators to understand the quality of overhead-view images or areas or sections of the overhead-view images. The curator may be provided with guidelines or a set of instructions as reference for determining annotations, what causes overhead-view images or areas/sections thereof to misalign with corresponding map layers for example, how to identify outliers and errors etc. Guidelines/instructions for data curation can demonstrate to curators, how overhead-view images or areas/sections thereof should be assessed, why overhead-view images contain errors or defects and explanation of those errors, how to identify such errors, and how to input and submit results. Such guidelines/instructions can provide consistency to the curation process and can also be used to effectively train new curators.

In some embodiments, the errors present in a displayed section of a map and be determined and relevant guidance can then be shown to a curator dynamically. Alternatively, the most likely guidance for the current view shown to a curator can be displayed. As a further alternative, based on user activity (for example, selecting a particular feature or filtering for a particular type or types of semantic data), the user interface can show the guidance determined to be the most relevant to the current user operation. Through the user platform 408, the curator may also be capable of identifying incorrect map data. In some embodiments, additional plug-ins may provide further tools to assist curators manually verify each task assigned or presented via the curation platform and can for example be used to apply shortcuts to the curation platform for more efficient data curation.

In embodiments, the geometric map layer may contain three-dimensional information of the world. This information can be very highly detailed to support precise calculations. Raw sensor data from LiDAR, various cameras, GPS, and IMUs can be processed using SLAM algorithms to first build a three-dimensional view of the region explored by the mapping data collect (i.e. sequential collection of data from a vehicle traversing an environment to be mapped). The outputs of the SLAM algorithm can be an aligned dense three-dimensional point cloud and a very precise trajectory taken by the mapping vehicle. Each of the three-dimensional points can be colored using the colors observed for that three-dimensional point in the corresponding camera images. The three-dimensional point cloud can be post-processed to produce derived map objects that are stored in the geometric map. Two important derived objects are the voxelized geometric maps and a ground map. The voxelized geometric map can be produced by segmenting the point cloud into voxels that are as small as 5 cm×5 cm×5 cm. During real-time operation, the geometric map can be the most efficient way to access point cloud information. It can offer a good trade-off between accuracy and speed. Segmentation algorithms can identify three-dimensional points in the point cloud for building a model of the ground, defined as the drivable surface part of the map. These ground points can be used to build a parametric model of the ground in small sections. The ground map can be key for aligning the subsequent layers of the map, such as the semantic map.

The semantic map layer can build on the geometric map layer by adding semantic objects. Semantic objects can include various traffic, two- and three-dimensional objects such as lane boundaries, intersections, crosswalks, parking spots, stop signs, traffic lights, etc. that are used for driving safely. These objects can contain rich metadata associated with them, such as speed limits and turn restrictions for lanes. While the three-dimensional point cloud might contain all of the pixels and voxels that represent a traffic light, it is in the semantic map layer that a clean three dimensional object identifying the three dimensional location and bounding box for the traffic light and its various components can be stored. One can use a combination of heuristics, computer vision, and point classification algorithms to generate hypotheses for these semantic objects and their metadata. The output of these algorithms might not be accurate enough to produce a high-fidelity map, however. Human operators can post-process these hypotheses via rich visualization and annotation tools to both validate the quality and fix any misses. For example, to identify traffic lights, one can first run a traffic light detector on the camera images. Visual SLAM can be used to process multiple camera images to get a coarse location of the traffic light in three dimensions. LiDAR points in the local neighborhood of this location can be matched and processed to produce the bounding box and orientation of the traffic light and its sub-components. One can also employ heuristics for solving simpler problems. For example, heuristics can be useful in the generation of lane hypotheses, yield relationships, and connectivity graphs at intersections. There can be a lot of structure in how these are setup for roads, especially since there are local laws that ensure consistency. Feedback from the human curation and quality assurance steps can be used to keep these up to date.

Figure 8:
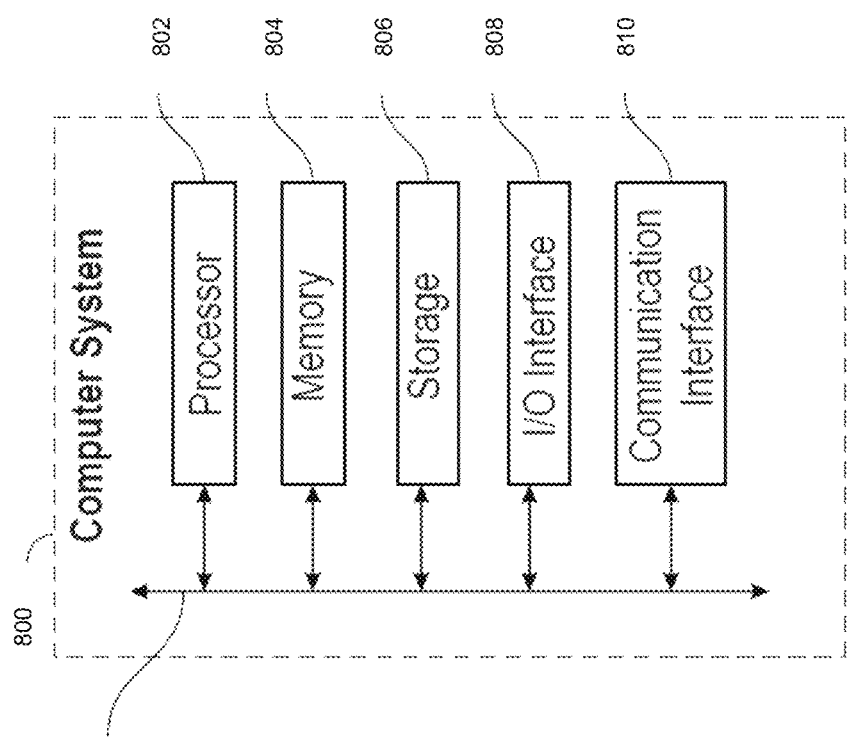
FIG. 8 illustrates an example of a typical computer system or computing device that can be used to execute the described processes of the claimed invention.

FIG. 8 illustrates an example computer system 800, which may be configured to perform the functions of one or more methods described or illustrated herein either alone or in combination with one or more other computer systems (which may take a similar form to computer system 800). In particular embodiments, software running on computer system 800 may enable computer system 800 to perform one or more functions of the one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform one or more functions of one or more methods described or illustrated herein without substantial spatial or temporal limitation. As an example, and not by way of limitation, one or more computer systems 800 may perform in real time or in batch mode one or more functions of one or more methods described or illustrated herein. One or more computer systems 800 may perform one or more functions of one or more methods described or illustrated herein at different times or at different locations, where appropriate.

In particular embodiments, computer system 800 includes at least one processor 802, non-transitory computer readable media such as memory 804 and storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing program instructions for causing computer system 900 to carry out one or more functions of one or more methods described or illustrated herein. As an example, and not by way of limitation, to execute program instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or may include multiple processing units. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may also include multiple memory units, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may also include multiple storage units. Although this disclosure describes and illustrates particular storage, this disclosure contemplates any suitable storage.

In particular embodiments, I/O interface 808 includes hardware or software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may also include multiple 1/O interface units, where appropriate. Although this disclosure describes and illustrates a particular I/O interface, this disclosure contemplates any suitable I/O interface.

In particular embodiments, communication interface 810 includes hardware or software, or both providing one or more interfaces for communication (such as, for example, packet-based communication) between computer system 800 and one or more other computer systems (or other network devices) via one or more networks. As an example, and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may also include multiple communication interface units, where appropriate. Although this disclosure describes and illustrates a particular communication interface, this disclosure contemplates any suitable communication interface.

In particular embodiments, bus 812 includes hardware or software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may also include multiple bus units, where appropriate. Although this disclosure describes and illustrates a particular bus, this disclosure contemplates any suitable bus or interconnect.

A map is a depiction of a whole area or a part of an area which emphasizes the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map.

Image data obtained for processing by at least one image sensor (e.g., an image sensor attached to a transportation vehicle), in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Many variations to the example method are possible. It should be appreciated that there can be additional, fewer, or alternative steps performed in similar or alternative orders, or in parallel, within the scope of the various embodiments discussed herein unless otherwise stated.

Any system features as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

What is claimed is:

1. A method comprising:
   obtaining a first layer of map data associated with sensor data capturing a geographical area, the first layer of map data comprising an aggregated overhead-view image of the geographical area,
   wherein obtaining the aggregated overhead-view image includes generating an aggregated overhead-view map from aggregated pixel values from a plurality of images that are ground-level images from a sensor with a limited field-of-view associated with the geographical area, wherein generating the aggregated overhead-view image of the geographical area includes using a ground map of the geographical area and the plurality of images of the geographical area,
   wherein generating the first layer includes sampling points from relevant images of the plurality of images for respective segments of the aggregated overhead-view map according to intersections of rays extrapolated from the relevant images;
   obtaining a second layer of map data, the second layer of map data comprising label data for the geographical area derived from the aggregated overhead-view image of the geographical area, including vehicle trajectory lines associated with vehicles that acquired the plurality of images, and points along the trajectory lines where the plurality of images were captured;
   causing the first layer of map data and the second layer of map data to be presented to a user for curation of the label data, wherein the second layer provides cues within a display about the relevant images from the plurality of images used to generate the map data along with editable points for modifying the map data of the second layer.

2. The method as recited in claim 1, wherein generating the first layer includes querying the plurality of images to identify the relevant images in which pixels of a specific segment of the aggregated overhead-view image occur by backpropagation of the rays for different cameras of the plurality of images to the specific segment.

3. The method as recited in claim 1, wherein causing the first layer and the second layer to be presented includes highlighting defects between the first layer and the second layer according to an automated comparison of the first layer and the second layer, and presenting suggestions for adapting the second layer according to the defects.

4. The method as recited in claim 1, wherein causing the first layer and the second layer to be presented includes acquiring electronic inputs to adjust at least the second layer, the electronic inputs include inputs for curation of the label data that comprises inputs from a group including verifying the label data, editing the label data, adding new label data to the label data, or removing incorrect or irrelevant label data from the label data based on a correspondence of the aggregated overhead-view image to the label data.

5. The method as recited in claim 1, wherein the second layer of the map data is generated by automatically extracting label data from the aggregated overhead-view image of the geographical area, wherein the label data comprises semantic map data.

6. The method as recited in claim 1, wherein the label data is automatically generated using one or more of: machine learning models; classifiers; or Generative Adversarial Networks.

7. The method as recited in claim 1, wherein the label data comprises one or more of: lane boundaries; lane connectivity; speed limits; types of traffic elements; crosswalks; speed bumps; pedestrian paths or sidewalks; manhole covers; or curbs.

8. A method comprising:
   receiving labeled map data of a geographical area from a mapping system, the labeled map data including:
   a first layer of map data comprising an aggregated overhead-view image of a geographical area, wherein receiving the aggregated overhead-view image includes generating an aggregated overhead-view map from aggregated pixel values from a plurality of images that are ground-level images from a sensor with a limited field-of-view of the geographical area, wherein generating the aggregated overhead-view image of the geographical area includes using a ground map of the geographical area and the plurality of images of the geographical area,
   wherein generating the first layer includes sampling points from relevant images of the plurality of images for respective segments of the aggregated overhead-view map according to intersections of rays extrapolated from the relevant images; and
   a second layer of map data comprising label data for the geographical area derived from the aggregated overhead-view image of the geographical area, including vehicle trajectory lines associated with vehicles that acquired the plurality of images, and points along the trajectory lines where the plurality of images were captured, wherein the second layer provides cues within a display about the relevant images from the plurality of images used to generate the map data along with editable points for modifying the map data of the second layer;
   displaying the first layer of map data and the second layer of map data to a user;
   receiving user input comprising one or more adjustments to the label data; and causing the label data to be adjusted in accordance with the user input.

9. The method as recited in claim 8, wherein causing the label data to be adjusted in accordance with the user input comprises one of (i) adjusting the label data locally and then providing the adjusted label data to the mapping system or (ii) providing the user input to the mapping system and thereby causing mapping system to adjust the label data.

10. The method as recited in claim 8, wherein causing the label data to be adjusted in accordance with the user input comprises causing the second layer of map data to be updated.

11. The method as recited in claim 8, further comprising: updating the second layer of the map in accordance with the user input.

12. The method as recited in claim 8, wherein the one or more adjustments to the label data are based on one or more of: a set of guidelines; a set of instructions; one or more plug-ins for adjustment; or one or more tools for adjustment input.

13. The method as recited in claim 8, wherein the one or more adjustments of the label data comprise one or more of: visual manipulation; determining abnormalities; determining alignments/misalignments; inputting one or more annotations; selecting/de-selecting one or more of the label data; removing/re-embedding one or more of the label data; hiding/exposing one or more of the label data; or enlargement/diminution of one or more of the label data.

14. The method as recited in claim 8, wherein the the first layer and the second layer are stored in one or more local system or a remote system.

15. The method as recited in claim 8, further comprising: causing a global map to be updated in accordance with the user input.

16. The method as recited in claim 8, wherein displaying the first layer of map data and the second layer of map data comprises displaying the second layer of the map overlaid on the first layer of the map.

17. A computer system comprising:
at least one processor;
at least one non-transitory computer-readable medium;
program instructions stored on the at least one non-transitory computer-readable medium that are executable by the at least one processor such that the computer system is capable of:
receiving labeled map data of a geographical area from a mapping system, the labeled map data including:
a first layer of map data comprising an aggregated overhead-view image of a geographical area, wherein receiving the aggregated overhead-view image includes generating an aggregated overhead-view map from aggregated pixel values from a plurality of images that are ground-level images from a sensor with a limited field-of-view of the geographical area, wherein generating the aggregated overhead-view image of the geographical area includes using a ground map of the geographical area and the plurality of images of the geographical area,
wherein generating the first layer includes sampling points from relevant images of the plurality of images for respective segments of the aggregated overhead-view map according to intersections of rays extrapolated from the relevant images; and
a second layer of map data comprising label data for the geographical area derived from the aggregated overhead-view image of the geographical area, including vehicle trajectory lines associated with vehicles that acquired the plurality of images, and points along the trajectory lines where the plurality of images were captured, wherein the second layer provides cues within a display about the relevant images from the plurality of images used to generate the map data along with editable points for modifying the map data of the second layer;
displaying the first layer of map data and the second layer of map data to a user;
receiving user input comprising one or more adjustments to the label data; and
causing the label data to be adjusted in accordance with the user input.

18. The computer system of claim 17, wherein causing the label data to be adjusted in accordance with the user input comprises one of (i) adjusting the label data locally and then providing the adjusted label data to the mapping system or (ii) providing the user input to the mapping system and thereby causing mapping system to adjust the label data.

19. The computer system of claim 17, further comprising program instructions that are executable by the at least one processor such that the computer system is capable of:
updating the second layer of the map in accordance with the user input.

20. The computer system of claim 17, wherein displaying the first layer of map data and the second layer of map data comprises displaying the second layer of the map overlaid on the first layer of the map.

* * * * *